Nov. 24, 1959     P. E. RUSS     2,913,915
PULLEY

Filed Nov. 14, 1956     2 Sheets-Sheet 1

INVENTOR.
PAUL E. RUSS
BY
Horace B. Van Valkenburgh
ATTORNEY

Nov. 24, 1959   P. E. RUSS   2,913,915
PULLEY

Filed Nov. 14, 1956   2 Sheets-Sheet 2

INVENTOR.
PAUL E. RUSS
BY
Horace B. Vanherhugh
ATTORNEY

United States Patent Office 2,913,915
Patented Nov. 24, 1959

2,913,915

PULLEY

Paul E. Russ, Englewood, Colo., assignor to The Gates Rubber Company, Denver, Colo., a corporation of Colorado Application November 14, 1956, Serial No. 622,178

9 Claims. (Cl. 74—230.5)

This invention relates to pulleys, and more particularly to V-belt pulleys which are adapted to permit the installation or removal of a relatively tight belt when the distance between the pulley centers cannot readily be changed.

In the usual installation of pulleys for V-belts, provision is made for changing or adjusting the distance between pulley centers, so that when a V-belt is to be installed, the distance between the centers may be decreased to permit the belt to be removed and another belt may be readily placed over the pulleys and the center distance then increased to tighten the belt. The pulleys for the V-belt which drives the fan, or the fan and generator of an automobile engine, are a common example of such an installation. However, there are certain instances in which such adjustment of the pulley centers, for removal or installation of a belt, is impractical or undesirable, such as the V-belts which may be installed in tandem wheel trucks and the like, wherein one wheel is driven directly from the engine and another wheel, normally disposed rearwardly of the engine driven wheel, is driven by a belt. There are usually two pairs of wheels on each side and the pulleys for such belts are conveniently located between the inner and outer wheels, to permit connection to the bolts by which the hubs of the outer wheels are attached and to permit the belts to occupy comparatively protected positions between the wheels. However, the belts must be sufficiently taut on the pulleys that belt slippage is minimized and adequate driving torque is transmitted between the wheels to cause the belt driven wheels to exert a desired driving force through frictional engagement with the roadway. Since there is normally no provision made for adjustment of the distance between the front and rear axles of such truck drives, the lengths of the belts used are such that the belt will be taut when placed around the pulleys and in the pulley grooves. In the event that such a belt becomes broken and must be replaced, it is a time-consuming task to remove both the front and rear outer wheels, then work the belt onto the pulleys. Also, there is danger of damage to the belt, in being worked onto a pulley when the distance between pulley centers cannot be changed. In addition, it sometimes happens that an inside wheel must be replaced by another wheel, having a suitable tire thereon, as when the tire on the inner wheel is incapable of carrying its load, such as due to a puncture, blowout or other reason. Needless to say, when an inner wheel is to be replaced, it is again time-consuming and disadvantageous to remove both outer wheels, merely for the purpose of replacing one inner wheel. Also, the possibility of damaging the belt while working it onto the pulleys, as well as taking it off the pulleys, is again present.

Among the objects of the present invention are to provide a novel pulley which is especially adapted for use with V-belts; to provide such a pulley which permits a V-belt to be removed or installed without the necessity of changing the distance between pulley centers, but the belt may be installed so as to be as taut as desired; to provide such a pulley which does not tend to cause damage to a belt during removal or installation; and to provide such a pulley which is relatively simple in construction and is readily manufactured.

The foregoing and additional objects of this invention, together with the novel features thereof, will become apparent from the description which follows, taken in connection with the accompanying drawings, in which.

Figure 1:
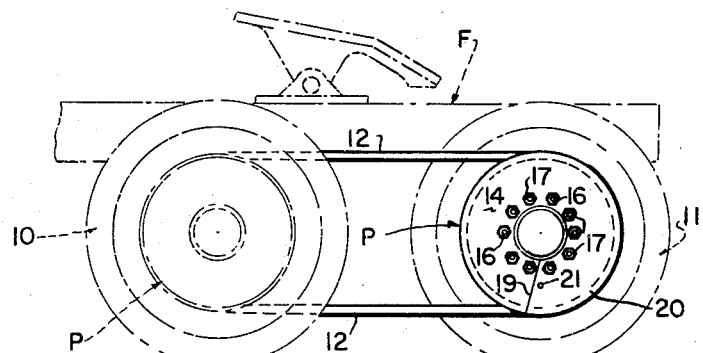
Fig. 1 is a side elevation of a tandem truck wheel installation utilizing pulleys constructed in accordance with this invention, showing only a portion of the truck frame and one of the outer wheels as having been removed, the latter to show more clearly the pulley normally disposed between the inner and outer wheels.
Figures 2, 3:
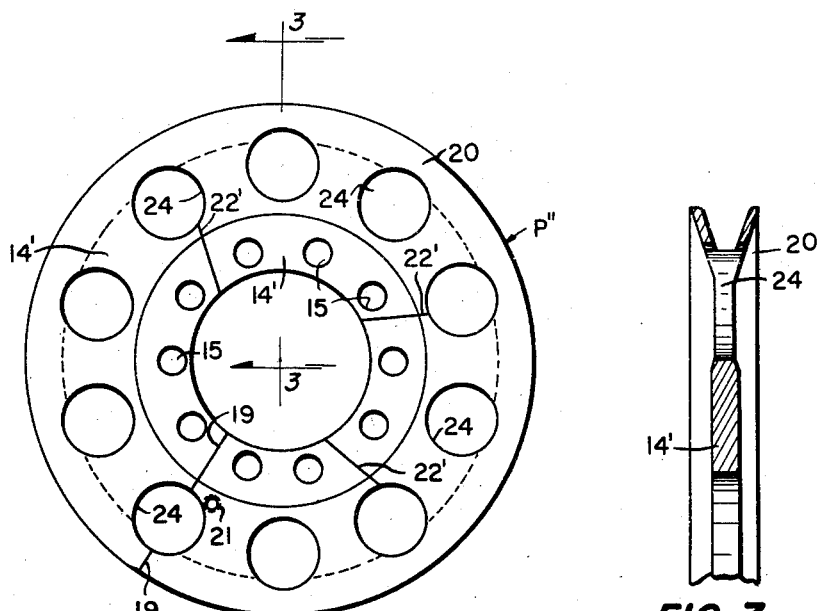
Fig. 2 is a side elevation, on an enlarged scale, of a pulley constructed in accordance with this invention and differing slightly from the pulleys shown in Fig. 1.
Fig. 3 is a fragmentary radial section, on a further enlarged scale, taken along line 3—3 of Fig. 2.

Although pulleys constructed in accordance with this invention are adapted to be used in other types of installations, one type of installation in which such pulleys have particular advantage is illustrated in Fig. 1, wherein a pair of wheels 10 and a pair of wheels 11 are disposed in tandem relation and attached to conventional axles mounted on a frame F of a truck, tractor or the like, it being understood that there are inner and outer forward wheels 10 on each side connected to an axle which may be driven from the engine and inner and outer rear wheels 11 on each side connected to an undriven axle or to stub axles. On each side of the truck, the rear wheels 11 may be driven from the forward wheels 10 by a V-belt 12 which engages a pulley P constructed in accordance with this invention and installed between each pair of wheels 10 and 11. It will be understood that the outer wheel 11 is not shown in Fig. 1, for clarity of illustration, and that the pulley P shown in dotted lines is disposed between the forward wheels 10. Each pulley P may be provided with an inner circumferential series of holes in a web 14 thereof, such as corresponding to holes 15 in web 14' of pulley P'' of Fig. 2, which holes fit over the studs 16 by which the hub of the outer wheel 10 or 11 is attached to the corresponding inner wheel. The pulleys P are held against the hub of the inner wheel 10 or 11 by nuts 17 which engage the studs 16, or in any other suitable manner.

In accordance with the present invention, each pulley P is provided with a radial slit 19 which extends from the inner edge of web 14 through the flanged rim 20, the groove of which is engaged by the belt 12, and a tapped hole 21 adapted to cooperate with a tool T of Fig. 7, in a manner described later, or any other suitable tool. The pulley construction may, of course, be varied considerably, as in the case of the pulley P' of Figs. 4, 5 and 6, or the pulley P'' of Figs. 2 and 3. Pulley P' may be similar to pulley P, being provided with a similar radial slit 19 and tapped hole 21, but also with a series of radial slits 22 extending only to the rim 20 and a series of arcuate holes 23 which open into the groove in the rim so that snow, dirt or other foreign material will be squeezed out through the holes to minimize the tendency for such foreign material to build up between the flanges of the rim. Pulley P" of Figs. 2 and 3, in addition to stud holes 15 in web 14', radial slit 19 and tapped hole 21, may also be provided with an outer circumferential series of circular holes 24, which extend into the groove in rim 20, engaged by the belt, for the same purpose as holes 23 of pulley P'. The inner portion of web 14' of pulley P" may be thickened, as in Fig. 3, while a series of generally radial slits 22' may extend outwardly in spaced positions to the adjacent holes 24. Neither radial slit 19 nor slits 22 or 22' should pass through a stud hole 15, while slits 22, as in Fig. 4, may pass beteen two of the holes 23, although slits 22 or 22' may intersect a hole 23 or 24, but in any event should extend only to rim 20. Slit 19 may pass through one of holes 24, as in Fig. 2.

The pulley of this invention may be formed of any suitable material, such as steel, and also may be cast, in which event the additional slits 22 or 22' are particularly desirable to provide additional flexibility of the web. While the slit 19, which passes completely through the pulley from the inside of the rim to the outside, preferably extends radially, the slits 23 or 24 may be cut at an angle to a radial position, as shown. Preferably, the slits are cut by a narrow band saw so as to minimize the width thereof, although the slits may be formed in any other suitable manner.

Figure 4:
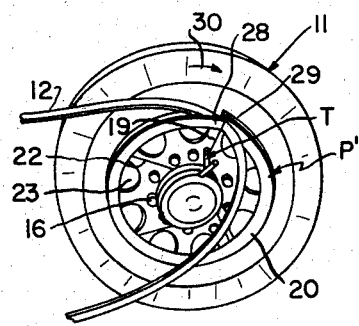
Fig. 4 is a perspective view of one wheel of an installation similar to Fig. 1, illustrating an initial step in installing, or a final step in removing, a V-belt from the pulley.
Figure 5:
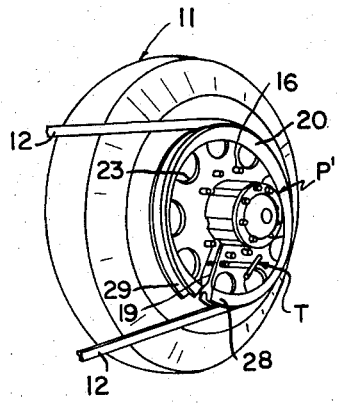
Fig. 5 is a similar perspective view, taken from a slightly different angle, illustrating a further step in installing, or an earlier step in removing, the belt.
Figure 6:
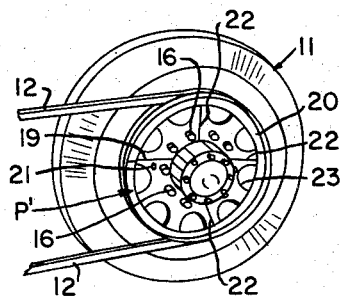
Fig. 6 is a perspective view, similar to Figs. 4 and 5, but taken from a slightly different angle and illustrating the taut V-belt on the pulley, either prior to removal or after installation.
Figure 7:
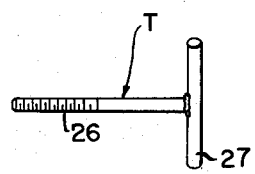
Fig. 7 is a side elevation of a tool particularly adapted to be utilized in connection with the pulley of this invention, the tool being shown also in Figs. 4 and 5.

For removing or installing a V-belt with pulleys of this invention, the tool of Fig. 7, or any other suitable tool, is particularly advantageous. The tool T may be provided with a threaded shank 26 adapted to engage tapped hole 21 of the pulley and a transverse handle 27 for rotating the tool. Assuming that the previous belt has broken and is to be replaced by a new belt and the outer wheel 11 has been removed and the tractor or the like jacked upon that side, the threaded shank 26 of the tool T is inserted in the tapped hole 21 and the nuts 17 on the studs 16 adjacent thereto and on the same side of slit 19 loosened or removed, so that when tool T is screwed into hole 21, the inner end of the tool will engage the hub of the inner wheel and a portion 28 of the pulley on the same side of the slit 19 will be forced axially outwardly, as in Fig. 4. Of course, the remaining nuts on the studs 16 are removed or loosened in accordance with their distance from the tool T, but at least the nut on the next stud on the opposite side of the slit 19 preferably is left tight. Thus, the portion 28 of the pulley on the same side of slit 19 as tool T may be moved outwardly until the pulley groove clears the outer flange of the pulley portion 29 on the opposite side of slit 19, as will be more clearly evident from Fig. 5, and the worn belt, if not already broken, removed. Then the new belt 12 may be placed over the pulley between the forward wheels 10 and also may be slipped over the outwardly or axially extending portion 28 of the pulley, as shown in Fig. 4, it being noted that since the pulley groove and the portion of the pulley adjacent tool T clears the outer flange of the rim 20 of the pulley portion 29 on the opposite side of the slit 19, there is sufficient clearance for the belt to be placed in the groove without difficulty. Then, the wheels 10 and 11 may be rotated, as in the direction of arrow 30 of Fig. 4, to move the belt around to the position of Fig. 5, the belt readily threading into the pulley rim, so that there is no possibility of damage to the belt. After the slit 19 has cleared the belt on the opposite side, as in Fig. 5, the tool T may be retracted and the nuts 17 tightened on the studs 16, thereby forcing the pulley together along the slit 19 and providing a smooth groove for the pulley, as in Fig. 6. Also, the pulley will be forced together along each of the slits 22 and 22' if the same are present. It will be understood, of course, that the pulley rim may be separated axially at the slit 19 in any other suitable manner, as by hand or with an appropriate tool, such as inserted in a hole 23 or 24 adjacent the slit 19. The rim may be held in the separated position, as by a lug nut or other article placed behind the web or rim, while the belt is moved onto the rim until the position of Fig. 5 is reached, after which the article holding the rim in separated position may be removed. In such event, the tapped hole 21 may, of course, be eliminated.

It will be noted that only sufficient flexibility of the pulley is necessary to permit the pulley to separate at slit 19 a distance corresponding to the belt groove and that if the pulley is made of forged steel or the like, the auxiliary slits, such as slits 22 or 22', may be omitted. However, for a cast steel pulley, additional flexibility is desirable and while the rim 20 may be twisted slightly about its axis without undue danger of damage to the pulley, there may be a possibility of damage when attempting to twist a pulley about its central axis when the web is solid. Thus, the auxiliary slits 22 and 22' need extend only to the rim 20, and particularly when disposed in spaced relation to each other and to the slit 19, do not require the pulley web to be twisted, but permit the rim 20 to twist slightly at the outer edge of each slit 22 or 22'. Thus, a pulley made of cast steel or other comparatively inflexible material, may be opened and closed, as it were, about slit 19 numerous times without damage to the pulley.

Although the removal and installation of a belt on a pulley of this invention has been described in connection with the pulley located between the rear wheels 11, it will be understood that the pulley between the forward wheels 10 may be similarly actuated by the tool T or a similar device in order to remove or install a belt on that pulley. For dual tandem wheel installations, as on a truck, tractor or the like, a pulley of this invention is preferably placed between both pairs of forward wheels 10 and rear wheels 11 on each side, so that if it is necessary to obtain access to the inside wheel 10, it will not be necessary to remove the outer rear wheel 11 also, in order to obtain access to only one pulley. It will be further understood that pulleys of this invention may be used in other types of installations in addition to the truck-tractor installation described, particularly those installations in which no provision has been made for adjustment for the distance between pulley centers, or when the same is impractical.

Although several embodiments of this invention have been illustrated and described with particularity, it will be understood that other embodiments may exist and that various changes may be made, all without departing from the spirit and scope of this invention.

What is claimed is:

1. In a pulley for a V-belt and the like, the combination of a web having a central opening providing an inner edge; a grooved rim; and a slit extending from the inner edge of said web through said rim, so that said pulley rim may be forced apart axially at said slit, said pulley being sufficiently flexible that when said pulley rim is forced apart axially at said slit the groove on one side of said slit will clear the edge of said rim on the opposite side of said slit.

2. In a pulley as defined in claim 1, wherein said slit is sufficiently narrow to prevent interference with the operation of said V-belt or the like with the sides of said slit in alignment.

3. A pulley as defined in claim 1, wherein said web is provided with at least one auxiliary slit extending from the inner edge of said web to said rim.

4. In a pulley as defined in claim 1, wherein said web is provided with a circumferential series of holes adapted to engage studs or the like for attaching said pulley to a hub and said slit extends between two of said holes.

5. A pulley as defined in claim 4, wherein said web is provided with an additional circumferential series of holes adjacent said rim and each of said latter holes connects with the groove in said rim, said latter holes being generally arcuate; and said web is provided with a series of circumferentially spaced, auxiliary slits extending outwardly from the inner edge of said web to said rim, each said auxiliary slit extending between two of said arcuate holes.

6. A pulley as defined in claim 4, wherein said web is provided with an additional circumferential series of holes adjacent said rim and each of said latter holes connects with the groove in said rim, said latter holes being generally circular; and said web is provided with a series of circumferentially spaced slits extending outwardly from the inner edge of said web, each of said auxiliary slits extending to one of said generally circular holes.

7. In a pulley for a V-belt or the like having a web and a grooved rim, said web having a central opening providing an inner edge, the improvement comprising a slit extending outwardly from the inner edge of said web to the outer edge of said rim; a tapped hole adjacent one edge of said slit and adapted to cooperate with a threaded member for forcing said pulley apart axially at said slit; and a series of circumferentially spaced holes adjacent the inner edge of said web, said web being otherwise imperforate.

8. In a pulley for a V-belt and the like, the combination of a web having a central opening providing an inner edge; a grooved rim; a slit extending from the inner edge of said web through said rim; and a tapped hole adjacent one side of said slit and adapted to cooperate with a tool having a threaded shank engageable with said tapped hole, so that said pulley rim may be forced apart axially at said slit.

9. An auxiliary belt transmission device for automotive vehicles of the type having tandem axles with dual tire rims mounted thereon in longitudinal alignment, comprising an annular sheave ring mounted on each axle and positioned between the dual rims thereon; radially projecting, flared apart flanges formed on each sheave ring to form a V-belt groove thereabout; an endless transmission belt trained about the two sheave rings and disposed in the grooves thereof, one of the sheave rings being transversely split at a point in its circumference so that the V-belt groove thereon may be distorted into a spiral shape; and means on the latter sheave ring adjacent the split therein for receiving an actuating tool to cause lateral distortion of said ring.

References Cited in the file of this patent

UNITED STATES PATENTS

| | | |
|---|---|---|
| 324,432 | Thomas et al. | Aug. 18, 1885 |
| 647,808 | Curren | Apr. 17, 1900 |
| 1,858,586 | Goldberg et al. | May 17, 1932 |
| 2,023,102 | Sauer | Dec. 3, 1935 |
| 2,090,987 | Russell | Aug. 24, 1937 |
| 2,733,612 | Sterkel | Feb. 7, 1956 |